United States Patent
Katsuki et al.

(10) Patent No.: US 6,724,104 B2
(45) Date of Patent: Apr. 20, 2004

(54) LINEAR MOTOR DRIVE APPARATUS

(75) Inventors: Masahide Katsuki, Shizuoka-ken (JP); Kazushi Kawatsu, Shizuoka-ken (JP); Masahai Gakuhari, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 102 days.

(21) Appl. No.: 09/964,438

(22) Filed: Sep. 28, 2001

(65) Prior Publication Data

US 2002/0038982 A1 Apr. 4, 2002

(30) Foreign Application Priority Data

Sep. 29, 2000 (JP) ..................... P2000-299530

(51) Int. Cl.[7] .............................................. H02K 41/00
(52) U.S. Cl. ......................................................... 310/12
(58) Field of Search ............................... 310/12, 13, 14

(56) References Cited

U.S. PATENT DOCUMENTS

| | | | | |
|---|---|---|---|---|
| 4,542,311 A | * | 9/1985 | Newman et al. ............... 310/13 |
| 4,555,650 A | * | 11/1985 | Asakawa ...................... 318/135 |
| 4,868,431 A | * | 9/1989 | Karita et al. .................. 310/12 |
| 4,912,746 A | * | 3/1990 | Oishi ........................... 310/12 |
| 5,763,965 A | * | 6/1998 | Bader ........................... 310/12 |
| 5,808,381 A | * | 9/1998 | Aoyama et al. ............... 310/12 |

FOREIGN PATENT DOCUMENTS

JP    64-206100 A    * 7/1999

* cited by examiner

Primary Examiner—Burton S. Mullins
Assistant Examiner—Judson H. Jones
(74) Attorney, Agent, or Firm—Finnegan, Henderson, Farabow, Garrett & Dunner, L.L.P.

(57) ABSTRACT

A linear motor drive apparatus has a fixed element (22) having a guide mechanism (23), a movable element (21) guided by the guide mechanism (23) so as to move along a reference plane (P), parallel rows of first magnets (30, 31) disposed in parallel to both sides of the reference plane (P) and mounted to the fixed element 22, and parallel rows of second magnets (26, 27) disposed in parallel to both sides of the reference plane (P) and mounted to the movable element (21), wherein the parallel rows of first magnets (30, 31) has planar symmetry with respect to the reference plane (P), and wherein a steel plate (40) is provided so as to be parallel to the reference plane (P) at an intersection part of the movable element (21) with the reference plane (P), the steel plate (4) having a narrowed end part.

6 Claims, 5 Drawing Sheets

LINEAR MOTOR DRIVE APPARATUS

BACKGROUND OF THE INVENTION

1. Field of the Invention

The present invention relates to a linear motor drive apparatus, and more particularly, to a linear motor drive apparatus suitable for application between a fixed element and a movable element of a precision machine tool.

2. Related Art

Research has been done with regard to a linear motor drive apparatus, to replace a drive apparatus formed by a combination of a ball screw and a nut, for the purpose of straight-linearly feeding a movable element, such as a work table or spindle stand, relative to a fixed element, such as a machine frame, of a precision machine tool. This linear motor has a row of magnets arranged on the fixed element, and a row of magnets arranged on the movable element.

Because the movable element of such a linear motor drive apparatus is guided by a guide mechanism provided in the fixed element, it is allowed to move along a reference plane for design of the guide mechanism, for example, a center plane thereof that divides the guide mechanism into two equal parts, left and right.

For this reason, a linear motor drive apparatus can be envisioned in which the magnets are arranged in parallel at both sides of the above-noted reference plane.

One target of research is determining how to arrange the magnets.

Another target of research is determining how to reduce a tendency toward cogging of the movable element of the linear motor drive apparatus (a jerking movement thereof, occurring when moving in a straight line) and yawing of the movable element (a rocking thereof from left to right).

Another target of research is developing a guide mechanism that achieves stable movement of the movable element.

There is a method of shifting the arrangement positions of the magnets by one-half pitch to the left and the right, so as to reduce the cogging of the movable element. Reducing the cogging using this method, however, results in an increase in yawing.

SUMMARY OF THE INVENTION

Accordingly, it is an object of the present invention to provide a linear motor drive apparatus, which reduces the cogging without an increase in the yawing.

In order to achieve the above-noted object, the inventors of the present invention discovered that, with planar symmetry between parallel rows of magnets and the reference plane, by providing a steel sheet parallel to the reference plane at an intersection between the movable element and the reference plane, if the shape of the steel plate is made narrow at the end, and in particular if it is made triangular, cogging of the movable element is reduced, that if the steel plate is provided symmetrically with respect to both sides of the movable element in the direction of movement of the movable element, there is a further prominent reduction in cogging, and that these effects are achieved regardless of whether the row of magnets mounted to the fixed element is a row of electromagnets or a row of permanent magnets.

Given the above, a first aspect of the present invention is a linear motor drive apparatus having a fixed element, which has a guide mechanism, a movable element, which is guided by the guide mechanism and which can move along a prescribed reference plane, a row of first magnets, which is mounted to the fixed element, and which is disposed in parallel to both sides of the reference plane, and a row of second magnets, which is mounted to the movable element, and which is disposed in parallel to both sides of the reference plane, wherein there is planar symmetry of the first parallel row of magnets with respect to the reference plane, and wherein a steel plate is provided in parallel with the reference plane, the steel plate having a narrowed end part.

According to this aspect of the present invention, by providing a steel plate in parallel to the reference plane at the intersection with the reference plane of the movable element, and narrowing an end part of the steel plate, cogging of the movable element is reduced, as can be understood from the discoveries of the inventors. Furthermore, because the row of first magnets is made to have planar symmetry with respect to the reference plane, yawing is also reduced.

A second aspect of the present invention is a variation on the linear motor drive apparatus of the first aspect, wherein the steel plate has a triangular shape. According to this aspect of the present invention, as is clear from the discoveries of the inventors of the present invention, there is a prominent reduction in cogging of the movable element.

A third aspect of the present invention is a variation on the linear motor drive apparatus of the first aspect, wherein the steel plate is provided so as to have planar symmetry with respect to both ends of the movable element along the direction of movement thereof. According to this aspect of the present invention, as is clear from the discoveries of the inventors of the present invention, there is a further reduction in cogging of the movable element, A fourth aspect of the present invention is a variation on a linear motor drive apparatus of any one of the first to the third aspects, wherein the row of first magnets comprises electromagnets, and wherein the row of second magnets comprises permanent magnets. According to this aspect of the present invention, as is clear from the discoveries of the inventors of the present invention, cogging of the movable element is reduced.

A fifth aspect of the present invention is a variation on a linear motor drive apparatus of any one of the first to the third aspects, wherein the row of first magnets comprises permanent magnets, and wherein the row of second magnets comprises electromagnets. According to this aspect of the present invention, as is clear from the discoveries of the inventors of the present invention, cogging of the movable element is reduced.

A sixth aspect of the present invention is a variation on a linear motor drive apparatus of any one of the first to the fifth aspects, wherein the guide mechanism is a pair of V-shaped grooves that have planar symmetry with respect to the reference plane. According to this aspect of the present invention, the movable element moves in a stable manner.

BRIEF DESCRIPTION OF THE DRAWING

The above and other features will be better understood from the exemplary embodiments described below, taken together with the drawings, of which.

DETAILED DESCRIPTION OF THE PREFERRED EMBODIMENTS

Embodiments of the present invention are described in detail below, with reference made to relevant accompanying drawings.

Figure 1:
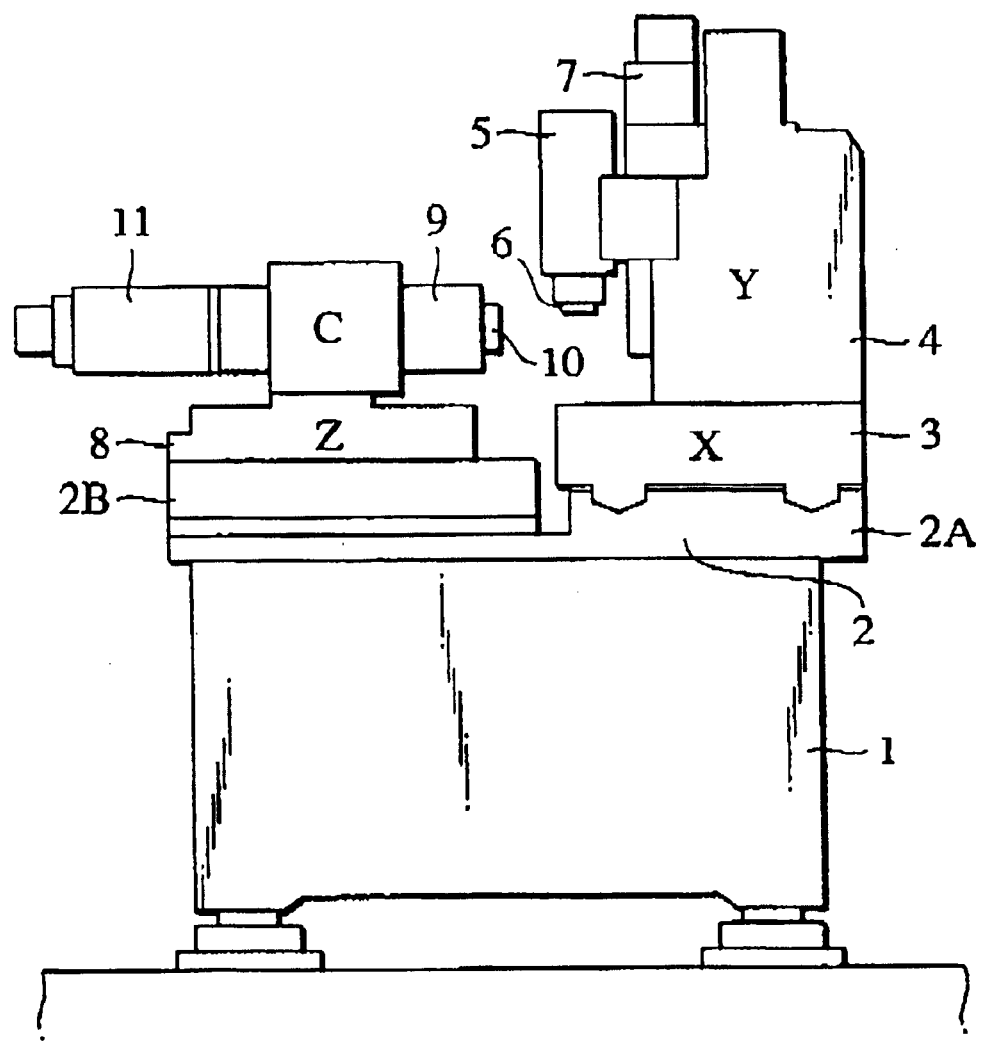
FIG. 1 is a front elevation of an ultra-precision machine tool for machining a die for an aspherical lens, to which a linear motor drive apparatus according to the present invention is applied.

Specifically, FIG. 1 shows an ultra-precision machine tool for machining a die for an aspherical lens, to which a linear motor drive apparatus according to the present invention is applied, This linear motor drive apparatus has a head 2, on which an X-direction tool-side head part 2A is formed, and to which a Z-direction workpiece head member 25B is mounted.

A slider 3 is provided on the tool-side head part 2A so as to be able to reciprocate in the X direction, a row 4 being provided on the slider 3. A Y-direction movable spindle stand 5 is provided on the row 4, this spindle stand 5 having a spindle 6, to which is mounted a cutting tool or a grinding tool or the like. The Y-axis direction drive of the spindle stand 5 is performed by a feed screw mechanism linked to a Y-axis servomotor 7.

The workpiece-side heated member 2B is provided with a work table 8 so that the work table 8 is allowed to move reciprocally in the Z-axis direction, and a rotating bearing block 9 is fixed to the work table 8. The rotating bearing block 9 has a rotating shaft 10 that grasps a workpiece by means of a chuck, the rotating shaft 10 being rotationally driven by a C-axis servomotor 11.

Figure 2:
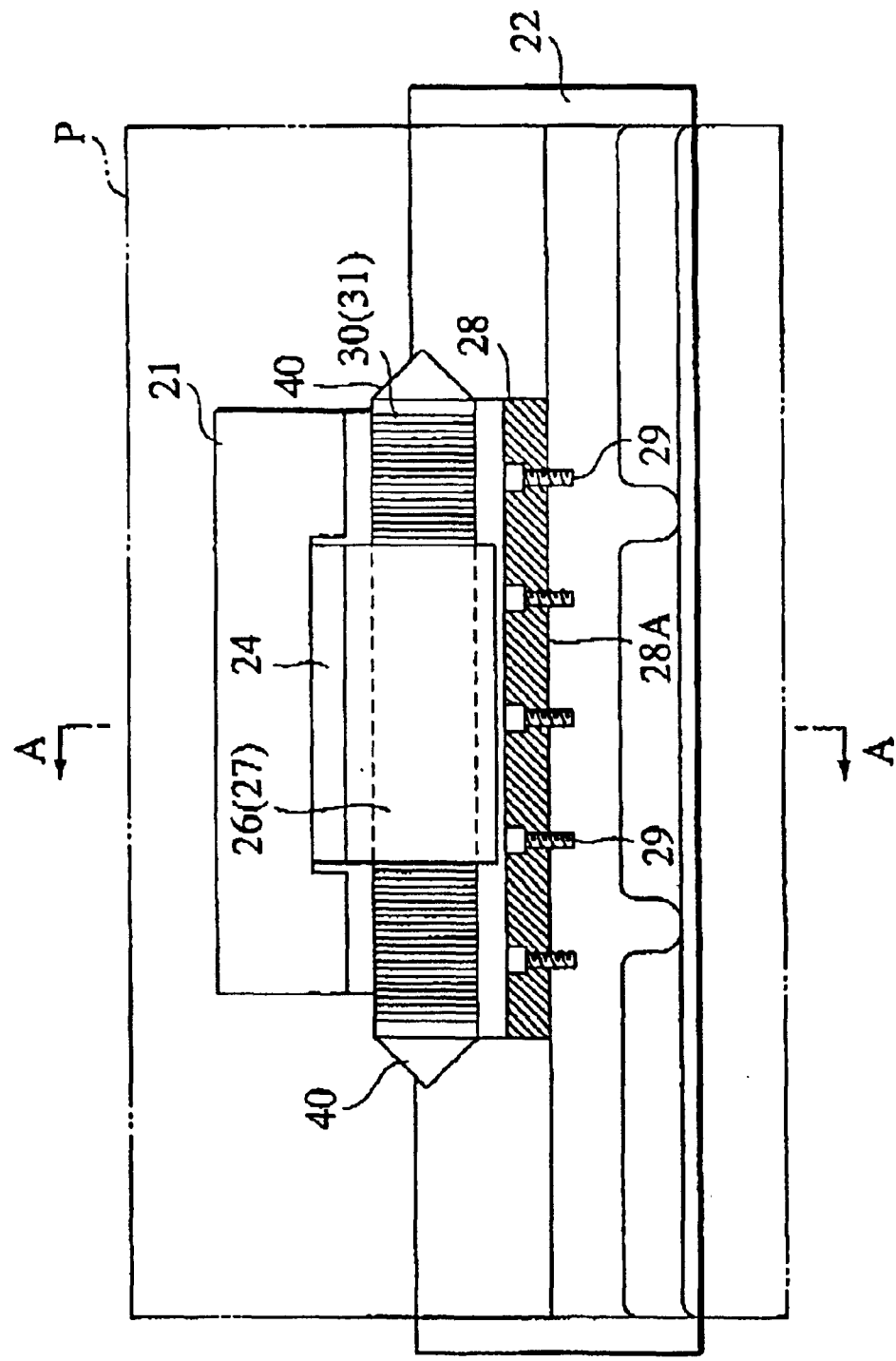
FIG. 2 is a side elevation of a linear motor drive apparatus according to an embodiment of the present invention.
Figure 3:
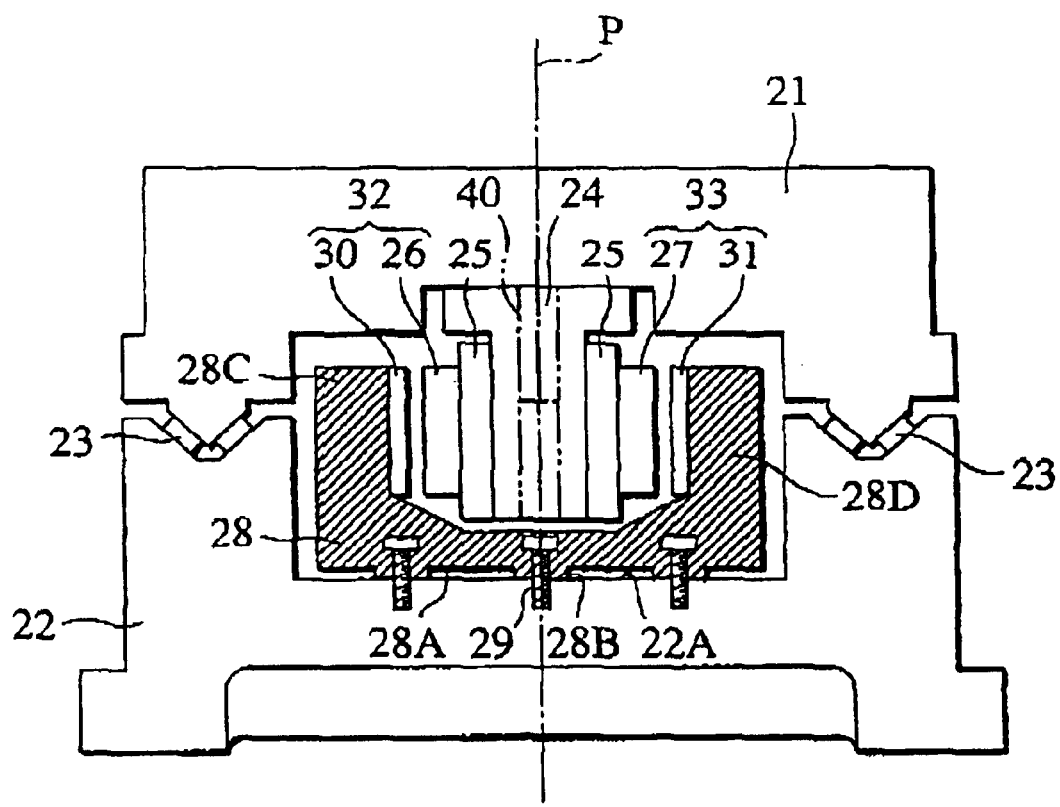
FIG. 3 is a cross-sectional view along the cutting line A—A of FIG. 2.

In a linear motor drive apparatus according to the present invention, the tool-side head part 2A or work-side head member 2B serves as the fixed element, and the slider 3 or the work table 8 serves the movably element. An embodiment of the present invention is described below, with references being made to FIG. 2 through FIG. 4. To achieve commonality, the slider 3 or work table 8 will be referred to as the movable element 21, and the tool-side head part 2A or work-side head member 2B will be referred to ax the fixed element 22.

A finite type upper V-shaped roller guide, is provided on the upper surface of the fixed element 22 on both left and right sides, so as to have left-to-right symmetry with respect to a designed reference plane (visual center plane) P of the linear motor drive apparatus, and a lower V-shaped finite roller guide is provided on the lower surface of the moving element 21, so as to have left-to-right symmetry with respect to the reference plane P, the inner part of the upper guide mating with the lower guide part to form a guide mechanism 23, which guides the reciprocating movement of the movable element 21.

A coil mounting member 24 is fixed to a center part of the bottom part of the movable element 21 so said to hang down therefrom, and a plurality of pairs of electromagnet coils 26 and 27 are mounted on the left and right sides of the coil mounting member 24, via cooling brackets 25, so as to be opposed back-to-back with one another, and parallel to and with left-to-right symmetry with respect to the reference plane P.

One magnet mounting member 28 having a grooved cross-section is mounted to the fixed element 22. The lower surface of a protrusion 28B provided with symmetry to the bottom pan 28A of the magnet mounting member 28 is seated onto the upper surface 22A of the fixed element 22, these being held in place by bolls 29. On the inner wall surfaces of the left and right side parts 28C and 28D of the mounting member 28 are mounted a plurality of pairs of permanent magnets 30 and 31, so as to be parallel to the reference plane P and so as to have left-to-right symmetry with respect to the reference plane P. The row of pairs of magnet coils 26 and 27 mounted to the movable element 21 move along the reference plane P between the rows of the pairs of permanent magnets 30 and 31 mounted to the fixed element 22. Although in this embodiment the row of pairs of magnet coils 26 and 27 and the row of pairs of permanent magnets 30 and 31 have equal pitches, it will be understood that the pitches can be different.

In the above-noted configuration, the row of left-side electromagnet coils 26 and left-side permanent magnets 30 form a left-side first linear motor 32, and the row of right-side electromagnet coils 27 and right-side permanent magnets 31 form a right-side second linear motor 33. The first linear motor 32 and the second linear motor 33, therefore, are mutually parallel, and symmetrical to the reference plane P.

Figure 4:
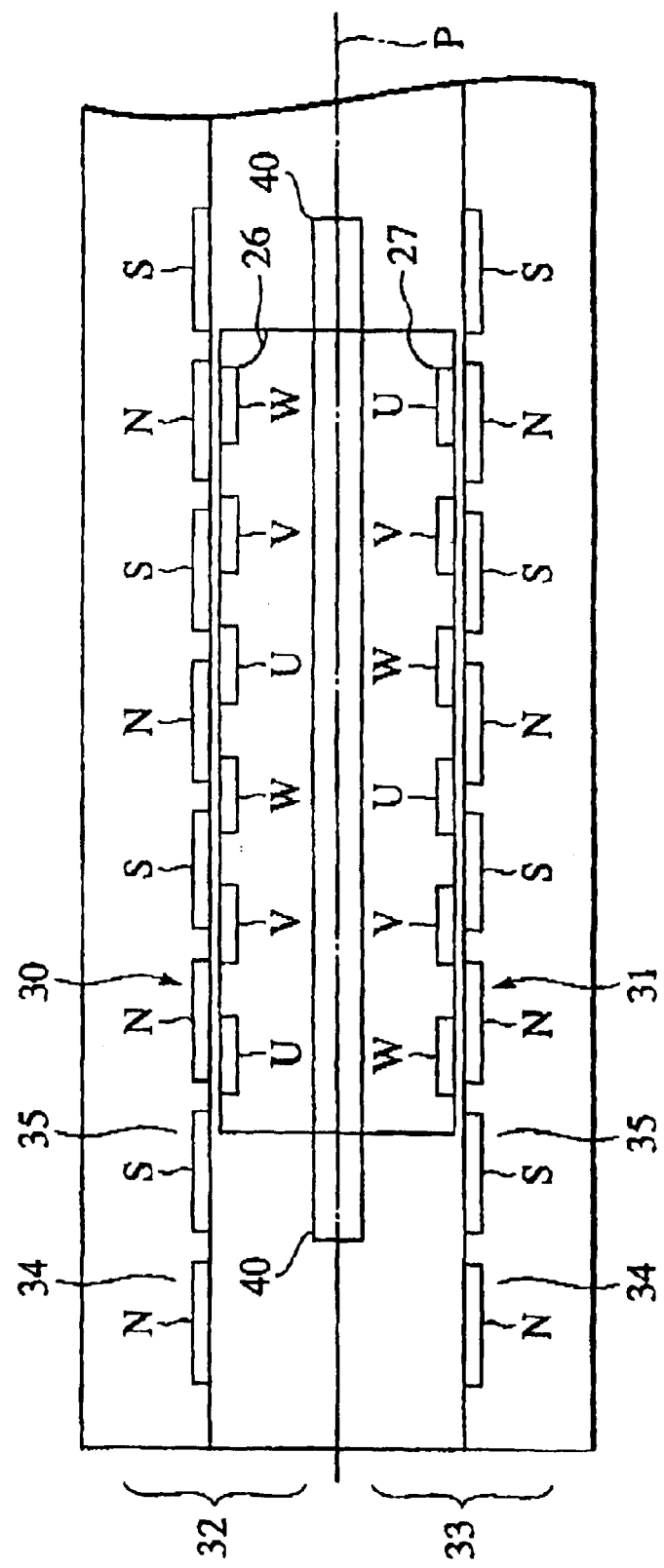
FIG. 4 is a schematic plan view of the linear motor drive apparatus of FIG. 2.

As shown in FIG. 4, the permanent magnets 30 of the first linear motor 32 and the permanent magnets 31 of the second linear motor 33 have alternating North poles 34 and South poles 35. These permanent magnets 30 and 31 are left-to-right symmetry with respect to the reference plane P, and there is no mutual offset in their positions. The electromagnet coils 26 of the first linear motor 32 and the electromagnet coils 27 of the second linear motor 33 have U, V and W poles arranged in mutually reversed order, and the opposing U-W poles and V-V poles each have left-to-right symmetry with respect to the reference plane P, and there is no mutual offset in their positions.

A steel plate 40 is provided with front-to-rear symmetry at an intersection part between the both end parts in the direction of movement of the movable element 21 (that is, the front and rear end parts) and the reference plane P, so as to be parallel to the reference plane P and have a narrowed end part (specifically, this is an isosceles triangle when view in from the side).

According to this embodiment of the present invention, by the magnetic action at the front and rear of the steel plate 40, cogging of the movable element 21 is reduced, and because of the left-to-right symmetry of the left and right linear motors 32 and 33, yawing of the movable element 21 is reduced.

Because the linear movement guide mechanism 23 is formed by a finite V-V roller guide, compared with the case of using static pressure guiding, greater rigidity is achieved, and precise feed is performed by means of high feed resolution. Because the electromagnet coils 26 and 27 are moving coil type electromagnet coils on the movable element 21 side, the holding force of the fist linear motor 32 and the second linear motor 33 acts at a fixed point on the movable element 21 at all times, so that the movement precision of the movable element 21 is stable. It is therefore possible to achieve the ultra-precise machining required for a die for an aspherical lens.

Figure 5:
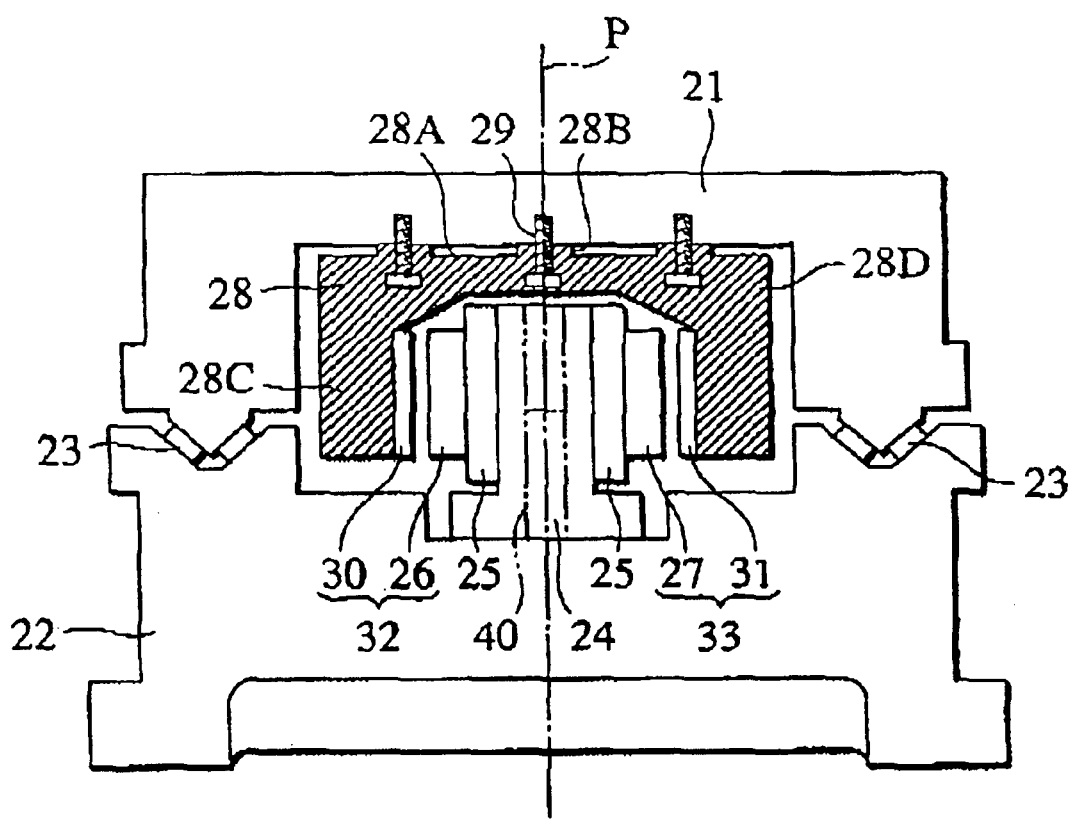
FIG. 5 is a sectional view of a linear motor drive apparatus according to another embodiment of the present invention.

FIG. 5 shows a linear motor drive apparatus according to another embodiment of the present invention, in which elements similar to elements of the foregoing embodiment are assigned similar reference numerals, and are not explicitly described herein.

In this embodiment, the electromagnet coils 26 and 27 are mounted to fixed element 22, and the mounting member 28 and permanent magnets 30 and 31 are mounted to the movable element 21, other aspects of the configuration being the same as the above-described embodiment.

This embodiment achieve the same type of operation and effect as the earlier described embodiment of the present invention.

As will be understood from the above detailed description of the present invention, the present invention provides a linear motor drive apparatus that reduces cogging without an increase in yawing of the movable element. That is, as discovered by the inventors, not only is there a reduction in cogging, but also the left and right components of the magnetic attraction force cancel each other out by virtue of the left-to-right symmetry of the two linear motors, so that there is a reduction in periodic yawing as well, so that the movable element does not waver at a pitch equivalent to the magnetic pole pitch. The result of this is an improvement in the linear movement of the movable element, and an improvement in machining precision.

According to a linear motor drive apparatus of the present invention, because the linear movement internal member is a finite V-V roller guide, compared to the case of static force guiding, greater rigidity is achieved, and precise feed is performed by means of high feed resolution.

While preferred embodiments of the present invention have been described using specific terms, such description is for illustrative purposes, and it is to be understood that changes and variations may be made without departing from the spirit or scope of the following claims.

What is claimed is:

1. A linear motor drive apparatus comprising:

a fixed element, which has a guide mechanism;

a movable element, which is guided by the guide mechanism and which can move along a prescribed reference plane;

parallel rows of first magnets, which are mounted to the fixed element, and which are arrayed in parallel at both sides of the reference plane; and parallel rows of second magnets, which are mounted to the movable element, and which are arrayed in parallel at both sides of the reference plane, wherein the parallel rows of first magnets are plane-symmetry with respect to the reference plane, and the movable element has, at a part thereof crossing the reference plane, a steel plate parallel to the reference plane, the steel plate having narrowed end parts.

2. A linear motor drive apparatus according to claim 1, wherein the steel plate has a triangular shape.

3. A linear motor drive apparatus according to claim 1, wherein the steel plate is provided so as to have planar symmetry with respect to both ends of the movable element along the direction of movement thereof.

4. A linear motor drive apparatus according to claim 1, wherein the row of first magnets comprises electromagnets, and wherein the row of second magnets comprises permanent magnets.

5. A linear motor drive apparatus according to claim 1, wherein the row of first magnets comprises permanent magnets, and wherein the row of second magnets comprises electromagnets.

6. A linear motor drive apparatus according to claim 1, wherein the guide mechanism is a pair of V-shaped grooves that have planar symmetry with respect to the reference plane.

* * * * *

UNITED STATES PATENT AND TRADEMARK OFFICE
CERTIFICATE OF CORRECTION

PATENT NO. : 6,724,104 B2  
DATED : April 20, 2004  
INVENTOR(S) : Masahide Katuki, Kazushi Kawatsu and Katsuji Gakuhari It is certified that error appears in the above-identified patent and that said Letters Patent is hereby corrected as shown below:

Title page,
Item [75], Inventors, "Masahi Gakihari" should read -- Katsuji Gakuhari --

Signed and Sealed this

Thirtieth Day of November, 2004

JON W. DUDAS
*Director of the United States Patent and Trademark Office*